(12) United States Patent
O'Brien et al.

(10) Patent No.: US 11,892,277 B2
(45) Date of Patent: Feb. 6, 2024

(54) NON-ELECTRIC INITIATOR SYSTEM

(71) Applicant: Detotec North America, Sterling, CT (US)

(72) Inventors: Timothy O'Brien, Pawcatuck, CT (US); Stephen W. Bartholomew, Simsbury, CT (US)

(73) Assignee: Detotec North America, Sterling, CT (US)

( * ) Notice: Subject to any disclaimer, the term of this patent is extended or adjusted under 35 U.S.C. 154(b) by 76 days.

(21) Appl. No.: 17/399,247

(22) Filed: Aug. 11, 2021

(65) Prior Publication Data
US 2022/0049936 A1    Feb. 17, 2022

Related U.S. Application Data

(60) Provisional application No. 63/064,097, filed on Aug. 11, 2020.

(51) Int. Cl.
| | |
|---|---|
| F42B 3/16 | (2006.01) |
| F42B 3/103 | (2006.01) |
| C06C 5/06 | (2006.01) |
| C06C 7/00 | (2006.01) |
| F42D 1/04 | (2006.01) |
| F42C 19/08 | (2006.01) |
| F42B 3/22 | (2006.01) |
| F02K 9/95 | (2006.01) |
| F42B 3/10 | (2006.01) |
| F41H 11/14 | (2006.01) |
| F42D 5/04 | (2006.01) |

(52) U.S. Cl.
CPC ............ F42B 3/103 (2013.01); F42B 3/10 (2013.01); F42B 3/16 (2013.01); F42C 19/0819 (2013.01); C06C 5/06 (2013.01); *C06C 7/00* (2013.01); *F02K 9/95* (2013.01); *F41H 11/14* (2013.01); *F42B 3/22* (2013.01); *F42D 1/04* (2013.01); *F42D 5/04* (2013.01)

(58) Field of Classification Search
CPC ... C06C 5/06; C06C 7/00; F41H 11/14; F42B 3/10; F42B 3/16; F42B 3/103; F42D 1/04; F42C 19/02; F42C 19/08; F42C 19/0819; F42C 19/0807; F42C 19/0815
USPC ................................ 102/275.11, 275.12, 380
See application file for complete search history.

(56) References Cited

U.S. PATENT DOCUMENTS

| | | | | |
|---|---|---|---|---|
| 3,011,441 | A | * | 12/1961 | Gordon ..................... F02K 9/95 102/202 |
| 3,129,663 | A | * | 4/1964 | Schnepfe, Jr. ............ F42D 1/04 137/516.15 |
| 3,610,151 | A | * | 10/1971 | Nett ..................... F42C 19/0819 102/204 |

(Continued)

*Primary Examiner* — James S Bergin
(74) *Attorney, Agent, or Firm* — McCormick, Paulding & Huber, PLLC

(57) ABSTRACT

A squib assembly for a non-electric initiator of an anti-personnel obstacle breaching system includes a housing configured to connect to the igniter of a rocket motor of the anti-personnel obstacle breaching system, a slider assembly slidably contained within the housing and configured to connect to a shock tube of the non-electric initiator, and a pyrotechnic element disposed within the housing. Upon activation of the non-electric initiator, the squib assembly is configured to mechanically puncture a base of a initiator sleeve of the rocket motor and to thermally initiate ignition of the rocket motor.

13 Claims, 6 Drawing Sheets

(56) References Cited

U.S. PATENT DOCUMENTS

| | | | | |
|---|---|---|---|---|
| 4,099,465 A | * | 7/1978 | Haake | F42C 15/31 |
| | | | | 102/380 |
| 5,327,835 A | * | 7/1994 | Adams | F42D 1/043 |
| | | | | 102/275.12 |
| 5,365,851 A | * | 11/1994 | Shaw | F42D 1/04 |
| | | | | 102/275.6 |
| 6,272,996 B1 | * | 8/2001 | O'Brien | C06C 5/06 |
| | | | | 102/275.1 |
| 10,837,747 B2 | * | 11/2020 | Wilson | F42C 15/32 |

* cited by examiner

NON-ELECTRIC INITIATOR SYSTEM

CROSS-REFERENCE TO RELATED APPLICATIONS

This application claims priority to U.S. Provisional Patent Application No. 63/064,097 filed Aug. 11, 2020, which is hereby incorporated by reference herein in its entirety.

TECHNICAL FIELD

This present disclosure relates to non-electric initiators for pyrotechnic pellets and gas generators.

BACKGROUND

Initiators are used to initiate deflagration of pyrotechnic charges from safe distances. For instance, an initiator may be employed to ignite a rocket motor of an Anti-Personnel Obstacle Breaching Systems (APOBS), which is an explosive line charge system that allows soldiers to safely breach enemy antipersonnel minefields, multi-strand wire obstacles, or the like. Because APOBS and their initiators are used by deployed soldiers in hostile environments, it is desirable for the initiators to be simplistic to operate and for their operation to be reliable, without misfires.

SUMMARY

The present disclosure provides a non-electric initiator that reliably and consistently initiates deflagration of pyrotechnic initiation charges from safe distances, such as initiating ignition of rocket motors of an APOBS. The non-electric initiator includes a squib assembly configured to mechanically puncture a base of an initiator sleeve of a rocket motor of an APOBS and to pyrotechnically initiate ignition of the rocket motor. By explosively separating the shock tube from the initiator squib, mechanically puncturing the base of the initiator sleeve of the rocket motor prior to ignition of the pyrotechnic ignitor in the rocket motor a pyrotechnic event, the non-electric initiator of the present disclosure advantageously improves reliability and provides for more consistent APOBS ignition as compared to APOBS ignition systems that rely solely on a pyrotechnic event to both rupture the initiator sleeve of the rocket motor 90 and to ignite the pyrotechnic ignitor in the rocket motor.

These and other objects, features and advantages of the present disclosure will become apparent in light of the detailed description of embodiments thereof, as illustrated in the accompanying drawings.

DETAILED DESCRIPTION

Before the various embodiments are described in further detail, it is to be understood that the invention is not limited to the particular embodiments described. It will be understood by one of ordinary skill in the art that the initiator and squib described herein may be adapted and modified as is appropriate for the application being addressed and that the components of the initiator and/or squib described herein may be employed in other suitable applications, and that such other additions and modifications will not depart from the scope thereof.

Figure 1:
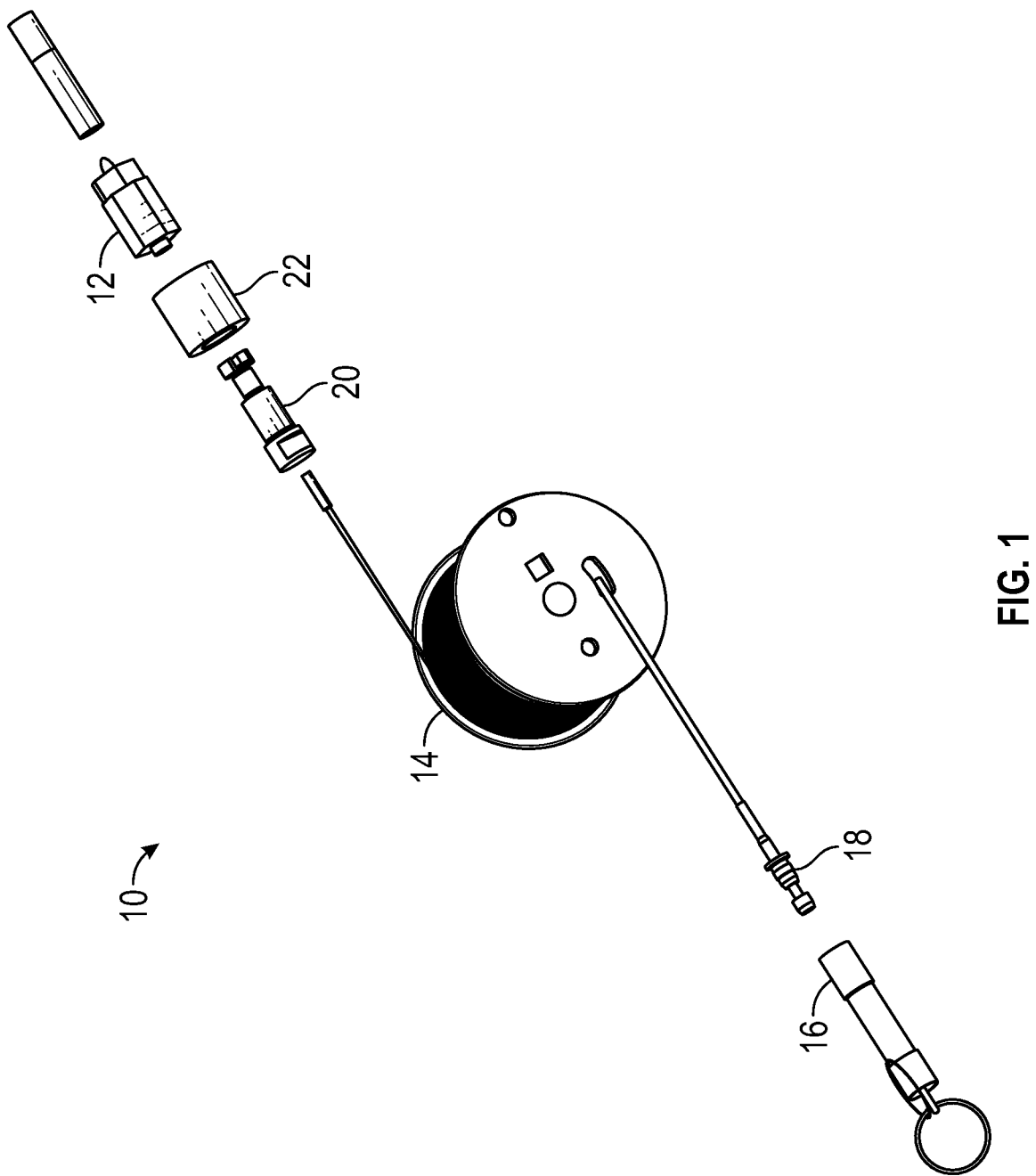
FIG. 1 is an exploded perspective view of a non-electric initiator according to the present disclosure.
Figure 2:
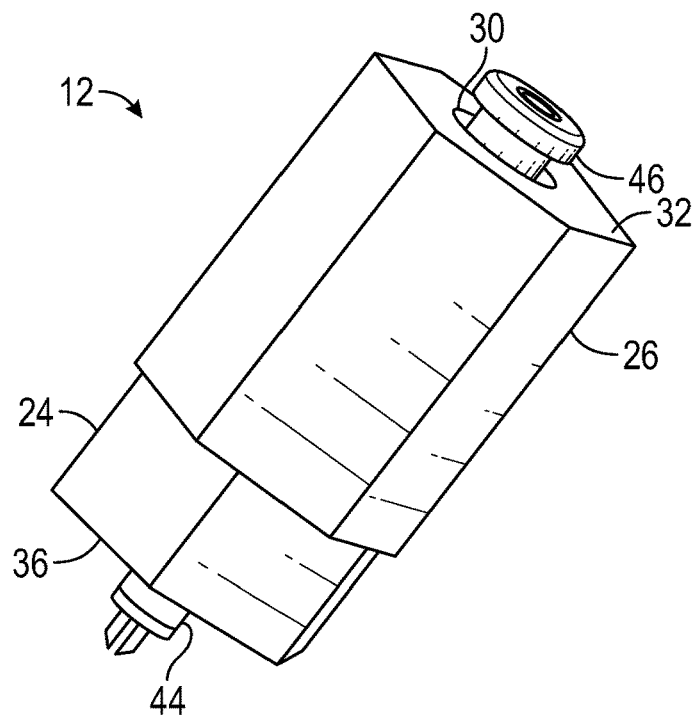
FIG. 2 is a front, top perspective view of a squib assembly of the non-electric initiator of FIG. 1 according to the present disclosure.

Referring to FIG. 1, an Anti-Personnel Obstacle Breaching Systems (APOBS) non-electric initiator 10 according to the present disclosure is shown. The APOBS non-electric initiator 10 includes a squib assembly 12, a shock tube assembly 14, a connector block 20, and a firing assembly 16. The squib assembly 12 is configured to be connected to a rocket of the APOBS in advance of activation of the APOBS. The shock tube assembly 14 has a firing assembly adapter 18 at one end that is configured to connect the shock tube to the firing assembly 16 and has a detonator at the other end containing explosive materials. The detonator is configured to be held captive in connector block 20 which at the other end is configured to connect the shock tube 14 to the squib assembly 12 to allow for remote activation of the APOBS. A foam cover 22 may be disposed around the connector block 20.

The shock tube 14, along with the firing assembly adapter 18 and the connector block 20 of the shock tube 14, and the firing assembly 16 may be formed from any commercially available shock tubes, connectors, and firing assemblies that are configured to operate as described herein. For instance, the shock tube 14 may be a shock tube spool from the Austin Powder Company that includes an M81 Adapter for the firing assembly adapter 18 and an a Austin Powder Company Quick Relay Surface Connector, which includes a quick relay mini-detonator, for the connector block 20. The firing assembly 16 may, likewise, be a commercially available M81 Firing Assembly configured to connect to the M81 Adapter.

Figure 5:
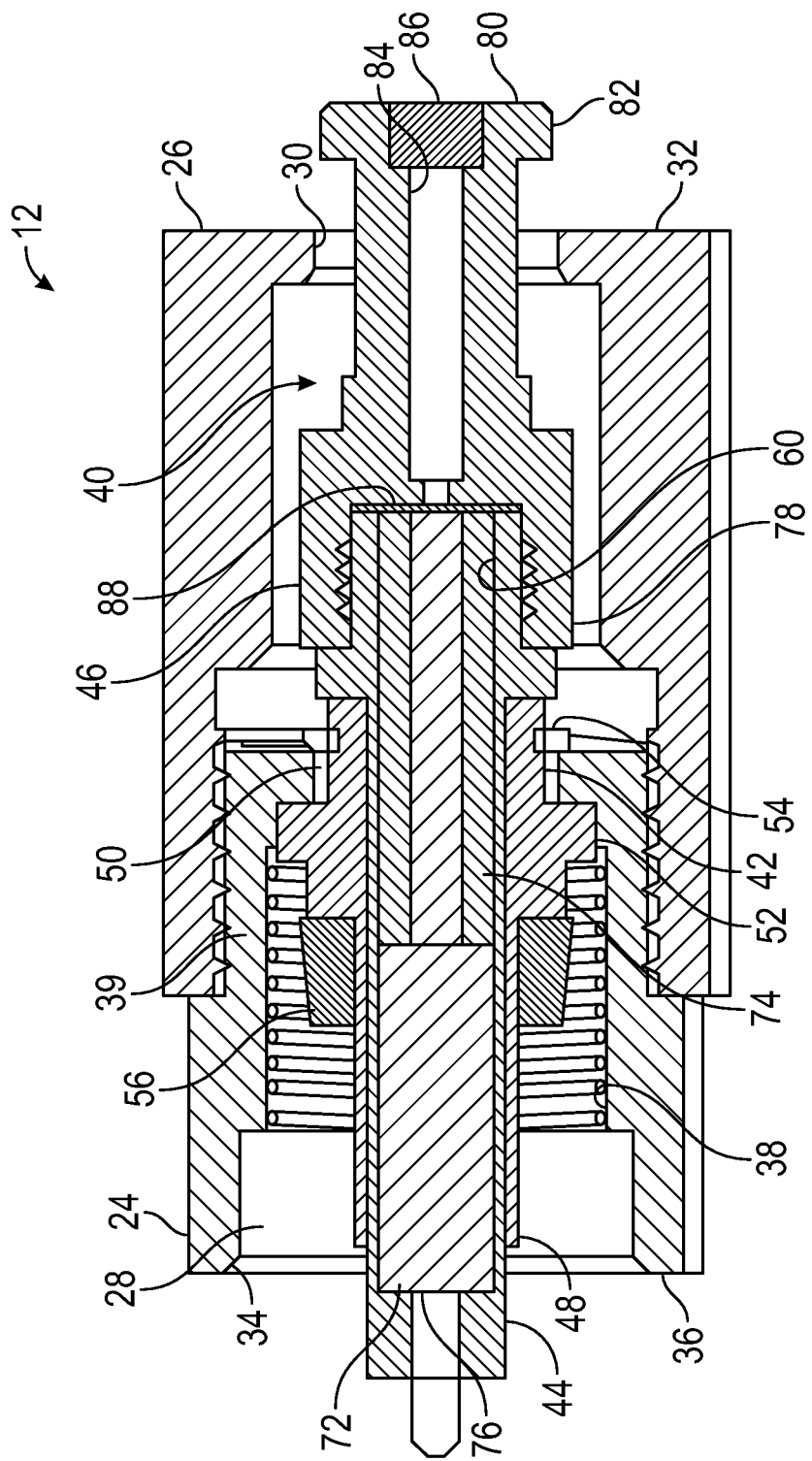
FIG. 5 is a front cross-sectional view of the squib assembly of FIG. 2.

Referring to FIGS. 2-5, the squib assembly 12 has a housing formed by an igniter nut 24 and a containment nut 26 and defines an internal passage 28, shown in FIG. 5, extending longitudinally through the squib assembly 12 from a first opening 30 formed at a first end 32 of the squib assembly 12 at the containment nut 26 to a second opening 34, shown in FIG. 5, formed at a second end 36 of the squib assembly 12 at the igniter nut 24. The igniter nut 24 includes internal threading 38 within the internal passage 28 proximate the second opening 34 at the second end 36 and includes an externally threaded projection 39 opposite second end 36. The containment nut 26 is configured to be threadedly secured onto the threaded projection 39 to form the housing of the squib assembly 12. The internal threading 38 is configured to engage corresponding threading on the cap body of an igniter of a rocket motor of the APOBS to secure the squib assembly 12 to the igniter.

The squib assembly 12 includes a slider assembly 40 positioned within the passage 28. The slider assembly 40 includes a squib base 42, a slider member 44, and a primer housing 46. The squib base 42 has a hollow tubular body 48 extending outward from a fixation end 50 and a flange 52 extending radially outward from the tubular body 48 proximate the fixation end 50. The squib base 42 is positioned in the internal passage 28 within the igniter nut 24, with the flange 52 abutting the end of the threaded projection 39 and the fixation end 50 extending through the end of the threaded projection 39 into the containment nut 26. A snap ring 54 is attached to the fixation end 50 to fixedly secure the squib base 42 to the igniter nut 24 by sandwiching the end of the threaded projection 39 between the snap ring 54 and the flange 52. A seal 56 is disposed on the tubular body 48 of the squib base 42 and is configured to seal the interface with the igniter of a rocket motor of the APOBS when the squib assembly 12 is secured to the igniter.

Figure 6:
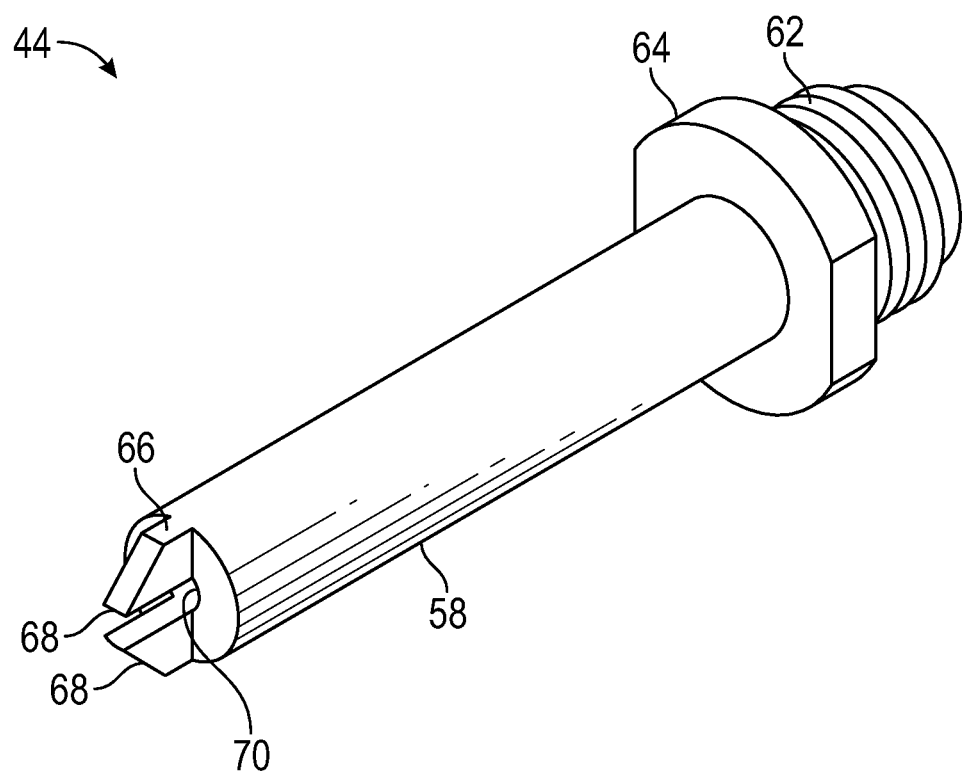
FIG. 6 is a bottom, front perspective view of a slider member of the squib assembly of FIG. 2.
Figure 7:
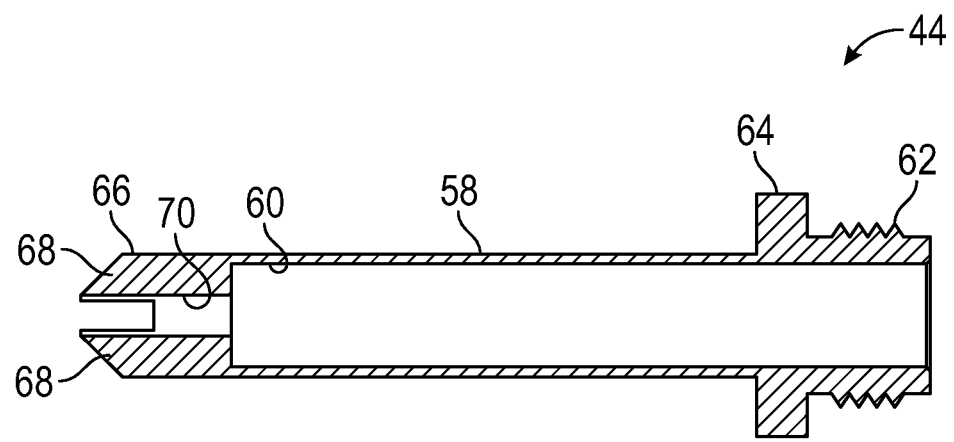
FIG. 7 is a front cross-sectional view of the slider member of FIG. 6.

Referring to FIGS. 6 and 7, the slider member 44 includes a hollow tubular body 58 defining a longitudinal passage 60, shown in FIG. 7. The slider member 44 includes a threaded head 62 formed at one end of the tubular body 58 and delineated from the tubular body 58 by a stopper flange 64 extending radially outward from the tubular body 58 and a piercing end 66 formed at the other end of the tubular body 58, the piercing end 66 including prongs 68 extending outward from tubular body 58 in the longitudinal direction and surrounding an outlet opening 70 in fluid communication with the longitudinal passage 60. The slider member 44 may be formed from a hardened steel or other suitable material having sufficient strength to puncture the base of an initiator sleeve of a rocket motor as discussed below.

Referring back to FIGS. 4 and 5, the longitudinal passage 60 of the slider member 44 has a pyrotechnic charge 72, such as BKNO3 or the like, disposed therein proximate the piercing end 66 and a delay element 74 extending from the pyrotechnic charge 72 to the end of the slider member 44 at the threaded head 62. A containment disk 76, formed from aluminum of the like, may be positioned between the pyrotechnic charge 72 and the piercing end 66 to ensure the pyrotechnic charge 72 remains contained within the longitudinal passage 60 prior to activation of the non-electric initiator of the present disclosure.

As seen in FIG. 5, the tubular body 58 of the slider member 44 is slidably disposed within the hollow tubular body 48 of the squib base 42, with the threaded head 62 and stopper flange 64 disposed in the longitudinal passage 28 within the containment nut 26 and with the piercing end 66 extending outward from the tubular body 48 of the squib base 42 proximate the second opening 34 in the igniter nut 24 at the second end 36 of the squib assembly 12.

Figure 3:
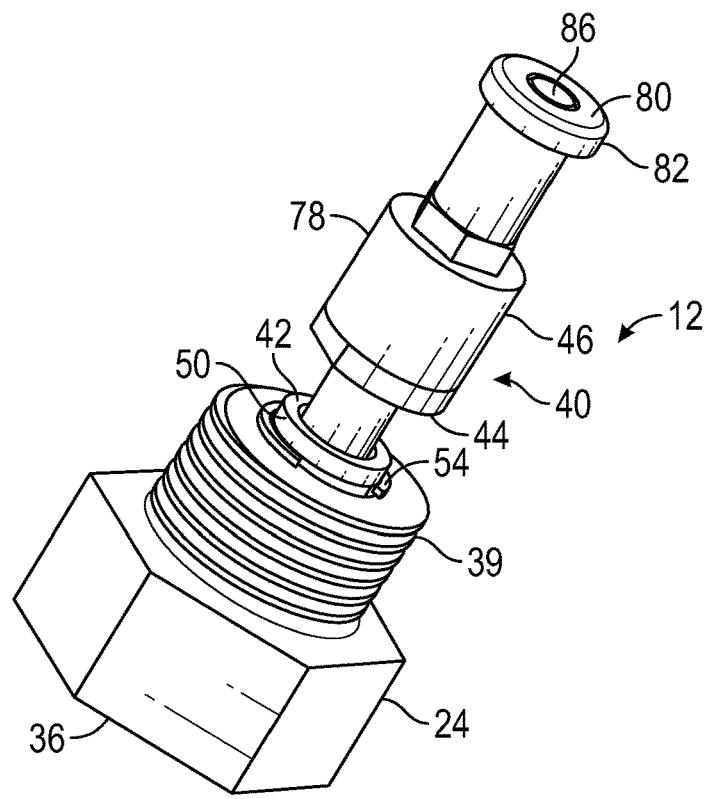
FIG. 3 is a front, top perspective view of the squib assembly of FIG. 2 with the containment nut removed.
Figure 4:
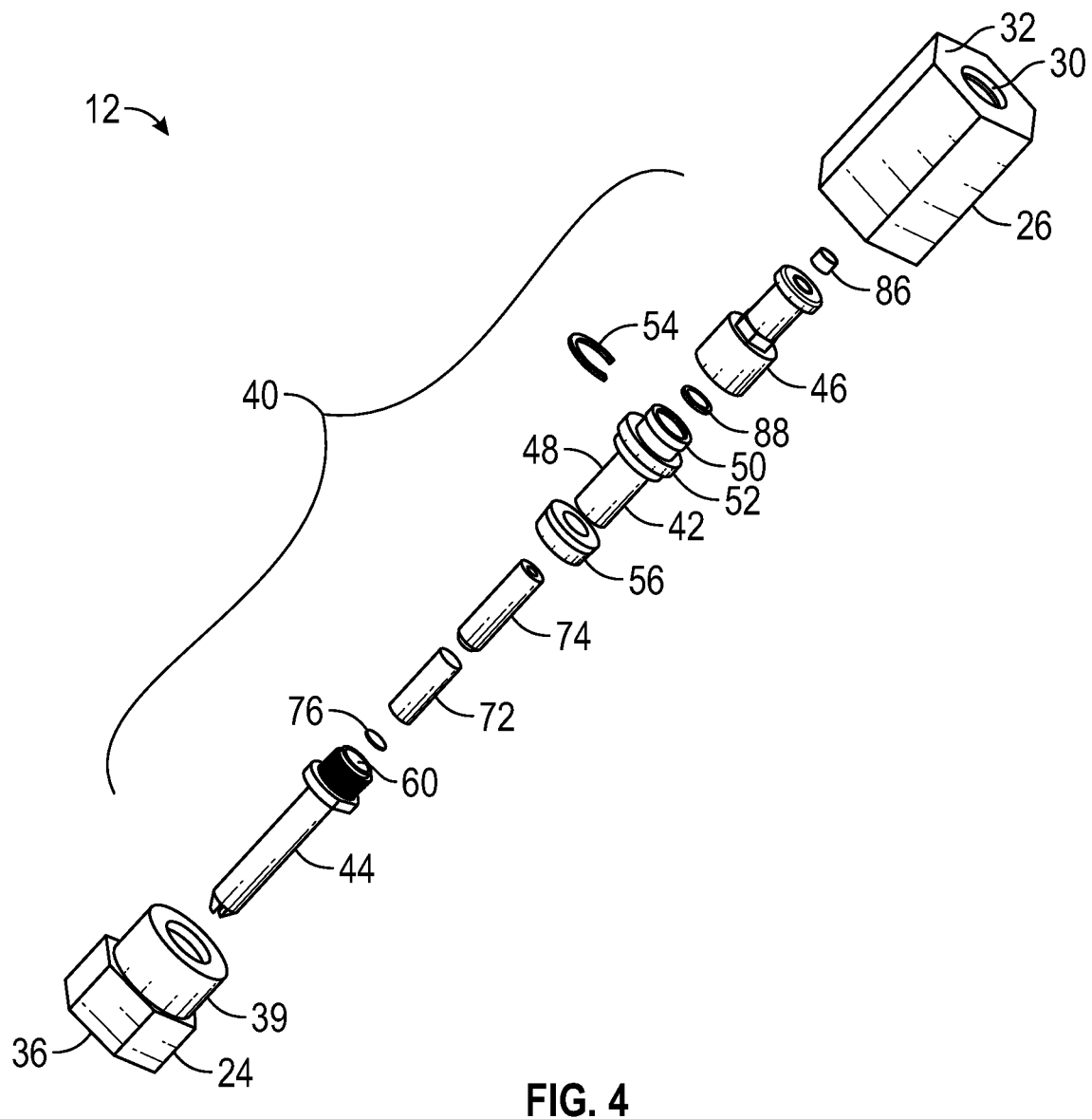
FIG. 4 is an exploded front, top perspective view of the squib assembly of FIG. 2.

Referring to FIGS. 3 and 5, the primer housing 46 has a first end 78 that is threadedly secured to the threaded head 58 of the slider member 44 in the longitudinal passage 28 within the containment nut 26 and a second end 80 that extends outward from the passage 28 through the first opening 30 formed in the containment nut 26. The first end 78 of the primer housing 46 is sized to be larger than the first opening 30 formed in the containment nut 26 so that the first end 78 and threaded head 58 are contained in the longitudinal passage 28 within the containment nut 26. The second end 80 of the primer housing 46 includes a connector block engagement feature 82 configured to interface with the connector block 20 of the shock tube 14 to attached the squib assembly 12 to the shock tube 14. The primer housing 46 has a central passage 84 extending therethrough that communicates with the longitudinal passage 60 of the slider member 44 at the first end 78 where the primer housing 46 is secured to the slider member 44. A primer 86 is disposed within the central passage 84 of the primer housing proximate the second end 80. A screen 88, also shown in FIG. 4, formed from stainless steel or the like, may be positioned between the primer housing 46 and the slider member 44 to ensure proper ignition of the delay element 74 by the primer 86, as should be readily understood by those skilled in the art.

Figure 8:
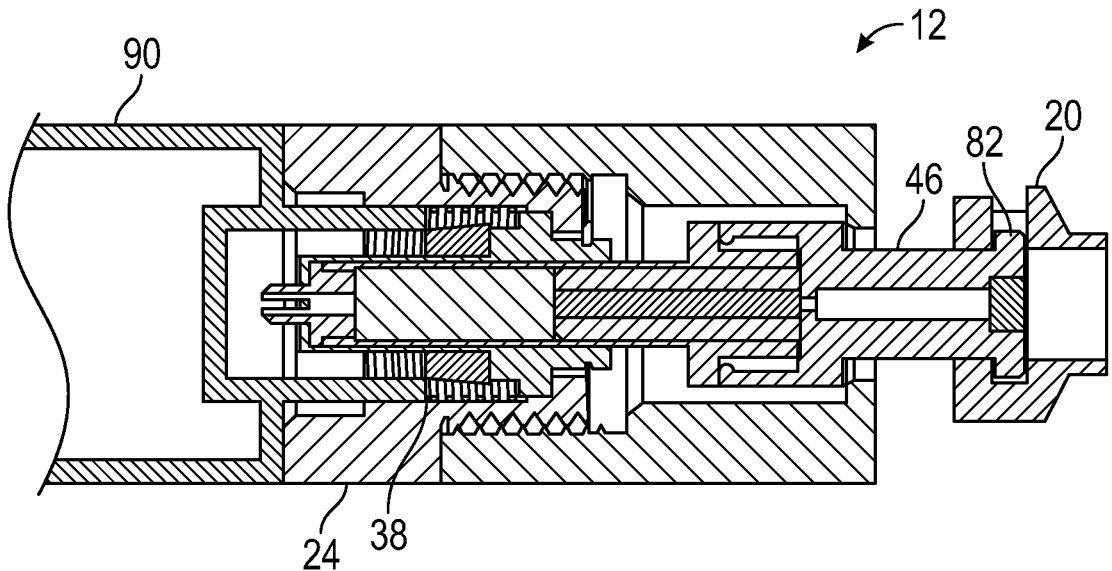
FIG. 8 is a front cross-sectional view of the squib assembly of FIG. 2 prior to initiation.

Referring to FIG. 8, in operation, an APOBS is readied for firing using the non-electric initiator 10 of the present disclosure, shown in FIG. 1, by attaching the squib assembly 12 to a rocket motor 90 of a rocket of an APOBS. This attachment is achieved by engaging the threads 38 of the igniter nut 24 with corresponding threads on the rocket motor 90. The squib assembly 12 is also connected to the connection block 20 of the shock tube 14, shown in FIG. 1, through engagement of the shock tube engagement feature 82 of the primer housing 46 with the connection block 20. The shock tube 14, shown in FIG. 1, may also be extended to its full length so that the APOBS can be fired from a safe standoff position, e.g., 100-250 feet or more away from the rocket. The APOBS is then fired through activation of the firing assembly 16, which sends a detonation signal through the shock tube 14 to the connector block 20.

Figure 9:
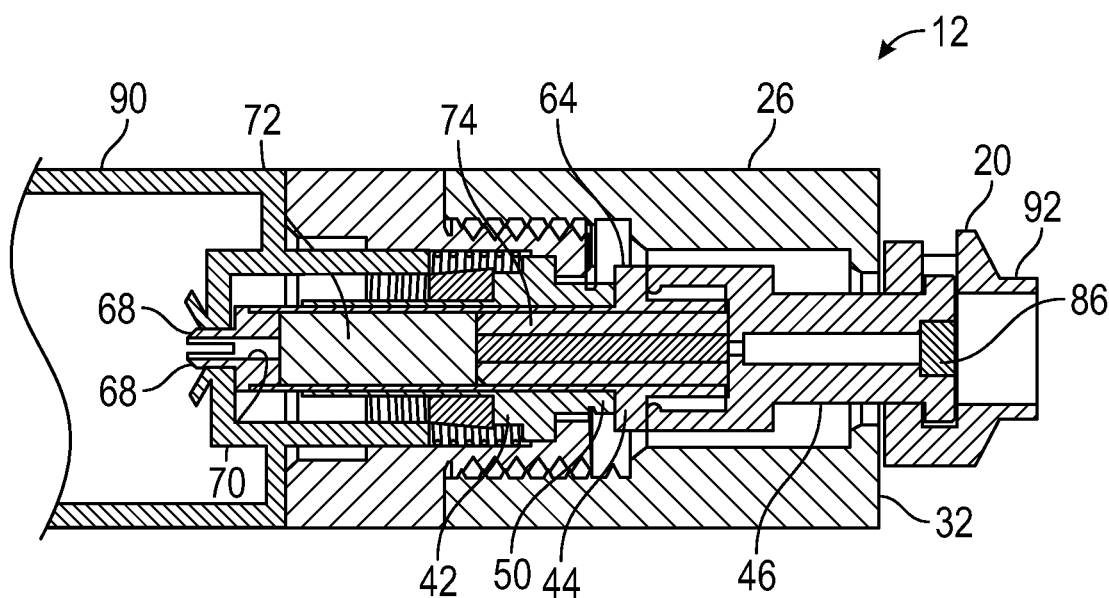
FIG. 9 is a front cross-sectional view of the squib assembly of FIG. 2 after to initiation.

Referring to FIG. 9, the detonation signal from the shock tube 14 causes detonation of the quick relay mini-detonator in the connector block 20, which severs a thin wall portion 92 of the connector block 20 to separate the shock tube 14, shown in FIG. 1, from the squib assembly 12. The detonation of the quick relay mini-detonator in the connector block 20 also ignites the primer 86 within the primer housing, and causes the primer housing 46 and slider member 44 attached thereto to translate longitudinally within the squib housing toward the rocket motor 90. For instance, the primer housing 46 and slider member 44 may be able to translate approximately 0.2 inches, with the movement being limited by contact between the primer housing 46 and opposite side of the first end 32 of the containment nut 26, contact between the stopper flange 64 of the slider member 44 and the fixation end 50 of the squib base 42, or both. As seen in FIG. 9, the longitudinal translation of the primer housing 46 and slider member 44 causes the prongs 68 of the slider member 44 to puncture the base of the initiator sleeve of the rocket motor 90. Although approximately 0.2 inches has been described as an exemplary translation distance, the squib assembly 12 may be provided with a different translation distance by altering the design of the slider member 44, the primer housing 46, and/or the containment nut 26.

As the primer housing 46 and slider member 44 translate, the primer 86 ignites the delay element 74. The delay element 74, in turn, ignites the pyrotechnic charge 72 after a delay of approximately 0.2 seconds. This delay allows the primer housing 46 and slider member 44 to fully translate so that the prongs 68 have punctured the base of the initiator sleeve of the rocket motor 90 prior to ignition of the pyrotechnic charge 72. Upon ignition of the pyrotechnic charge 72, hot gases and particles from the pyrotechnic charge 72 pass through outlet opening 70 of the slider member 44 and into the igniter of the rocket motor 90 of the APOBS, thereby causing ignition of the pyrotechnic igniter in the rocket motor 90. The seal 56 disposed on the tubular body 48 of the squib base 42 sealing the interface with the igniter of a rocket motor 90 ensures that the output from the pyrotechnic charge 72 passes into the igniter of the rocket motor 90.

The rocket then propels a line charge with fragmentation grenades over a minefield, wire obstacle, or the like. The fragmentation grenades are then detonated to neutralize or clear mines and/or sever wire obstacles along the rocket's travel path, which clears a long footpath for troops (approximately 150 feet in length and 3-5 feet in width).

Mechanically puncturing the base of the initiator sleeve of the rocket motor 90 with the slider member 44 prior to ignition of pyrotechnic igniter in the rocket motor 90 by the pyrotechnic charge 72 advantageously improves reliability and provides for more consistent APOBS ignition as compared to APOBS ignition systems that rely solely on pyrotechnic events to both rupture the base of the initiator sleeve of the rocket motor 90 and to ignite the pyrotechnic igniter in the rocket motor. Specifically, by mechanically perforating the initiator sleeve just prior to the squib output charge function from the pyrotechnic charge 72, the squib assembly 12 of the present disclosure advantageously removes the barrier of the initiator sleeve and any variability of force and loss of output charge energy required to perforate the sleeve through the output charge.

Additionally, the shock tube assembly 14 and connector block 20 of the present disclosure also advantageously separates the shock tube separation event from the pyrotechnic pressure event that ignites the rocket motor.

Thus, the non-electric initiator 10 according to the present disclosure advantageously provides for reliable, consistent ignition of APOBS rockets while allowing the APOBS to be fired from a safe standoff position, e.g., 100-250 feet away from the APOBS rocket.

While the principles of the present disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A squib assembly for a non-electric initiator of an anti-personnel obstacle breaching system, the squib assembly comprising:
   a housing configured to connect to an igniter of a rocket motor of the anti-personnel obstacle breaching system;
   a slider assembly slidably contained within the housing and configured to connect to a shock tube of the non-electric initiator; and
   a pyrotechnic element disposed within the housing;
   wherein, upon activation of the non-electric initiator, the slider assembly is configured to mechanically puncture a base of an initiator sleeve of the rocket motor, and the pyrotechnic element is configured to thermally initiate ignition of the rocket motor igniter;
   wherein the slider assembly comprises a tubular body defining a longitudinal passage therethrough;
   wherein the pyrotechnic element is disposed within the longitudinal passage; and
   wherein the slider assembly comprises a piercing end formed at one end of the tubular body, the piercing end being configured to mechanically puncture the base of the initiator sleeve of the rocket motor.

2. The squib assembly according to claim 1, wherein the piercing end comprises at least two prongs extending outward from the tubular body in the longitudinal direction and surrounding an outlet opening of the longitudinal passage.

3. The squib assembly according to claim 1, wherein the slider assembly further comprises a threaded head formed at a second end of the tubular body opposite the piercing end and a stopper flange proximate the threaded head, the stopper flange extending radially outward from the tubular body and delineating the threaded head from the tubular body.

4. The squib assembly according to claim 3, further comprising a primer housing having a primer disposed therein, the primer housing attached to the threaded head of the slider assembly and comprising a connector block extending outward from the housing of the squib assembly, the connector block configured to facilitate connection to the shock tube of the non-electric initiator.

5. The squib assembly according to claim 4, wherein the housing is configured to interact with the stopper flange to limit sliding movement of the slider assembly in a first longitudinal direction and to interact with the primer housing to limit sliding movement of the slider assembly in a second longitudinal direction.

6. A non-electric initiator for an anti-personnel obstacle breaching system, the non-electric initiator comprising:
   a squib assembly configured to mechanically puncture a base of an initiator sleeve of a rocket motor of the anti-personnel obstacle breaching system and to thermally initiate ignition of the rocket motor;
   wherein the squib assembly comprises:
      a housing having a hollow interior; and
      a slider assembly at least partially disposed in the hollow interior of the housing and slidably moveable relative to the housing between a first position defined by a first stop and a second position defined by a second stop
   wherein the slider assembly comprises a tubular body defining a longitudinal passage therethrough; and
   wherein a pyrotechnic element is disposed within the longitudinal passage; and
   wherein the slider assembly comprises a piercing end formed at one end of the tubular body, the piercing end being configured to mechanically puncture the base of the initiator sleeve of the rocket motor.

7. The non-electric initiator according to claim 6, wherein the piercing end comprises at least two prongs extending outward from the tubular body in the longitudinal direction and surrounding an outlet opening of the longitudinal passage.

8. The non-electric initiator according to claim 6, wherein the slider assembly further comprises:
   a threaded head formed at a second end of the tubular body opposite the piercing end; and
   a primer housing attached to the threaded head, the primer housing having a primer disposed therein and having a connector block extending outward from the housing of the squib assembly, the connector block configured to facilitate connection to a shock tube of the non-electric initiator.

9. The non-electric initiator according to claim 6, wherein the housing includes a first stop configured to interact with the slider assembly to limit sliding movement of the slider assembly in a first longitudinal direction at the first position and a second stop configured to interact with the slider assembly to limit sliding movement of the slider assembly in a second longitudinal direction at the second position.

10. A non-electric initiator for an anti-personnel obstacle breaching system, the non-electric initiator comprising:
   a squib assembly, the squib assembly comprising:
      a housing configured to connect to an igniter of a rocket motor of the anti-personnel obstacle breaching system;

a slider assembly slidably contained within the housing, the slider assembly configured to connect to a shock tube of the non-electric initiator; and a pyrotechnic element disposed within the housing;

wherein the slider assembly is configured to mechanically puncture a base of an initiator sleeve of the rocket motor, and the pyrotechnic element is configured to thermally initiate ignition of the rocket motor igniter upon activation of the non-electric initiator;

wherein the slider assembly comprises a tubular body defining a longitudinal passage therethrough;

wherein the pyrotechnic element is disposed within the longitudinal passage; and wherein the slider assembly comprises a piercing end formed at one end of the tubular body, the piercing end being configured to mechanically puncture the base of the initiator sleeve of the rocket motor.

11. The non-electric initiator according to claim 10, wherein the piercing end comprises at least two prongs extending outward from the tubular body in the longitudinal direction and surrounding an outlet opening of the longitudinal passage.

12. The non-electric initiator according to claim 10, wherein the slider assembly further comprises:

a threaded head formed at a second end of the tubular body opposite the piercing end; and a primer housing attached to the threaded head, the primer housing having a primer disposed therein and having a connector block extending outward from the housing of the squib assembly, the connector block configured to facilitate connection to a shock tube of the non-electric initiator.

13. The non-electric initiator according to claim 10, wherein the housing includes a first stop configured to interact with the slider assembly to limit sliding movement of the slider assembly relative to the housing in a first longitudinal direction and a second stop configured to interact with the slider assembly to limit sliding movement of the slider assembly relative to the housing in a second longitudinal direction.

* * * * *